(12) United States Patent
Pereira et al.

(10) Patent No.: US 11,487,033 B2
(45) Date of Patent: Nov. 1, 2022

(54) RTM USING EQUAL AREA SPHERICAL BINNING FOR GENERATING IMAGE ANGLE GATHERS

(71) Applicant: CGG SERVICES SAS, Massy (FR)

(72) Inventors: Roberto Pereira, Rio de Janeiro (BR); Adel Khalil, Rio de Janeiro (BR)

(73) Assignee: CGG SERVICES SAS, Massy (FR)

( * ) Notice: Subject to any disclaimer, the term of this patent is extended or adjusted under 35 U.S.C. 154(b) by 177 days.

(21) Appl. No.: 17/137,550

(22) Filed: Dec. 30, 2020

(65) Prior Publication Data

US 2021/0325555 A1 Oct. 21, 2021

Related U.S. Application Data

(60) Provisional application No. 63/010,765, filed on Apr. 16, 2020.

(51) Int. Cl.
| | | |
|---|---|---|
| *G01V 1/28* | (2006.01) | |
| *G01V 1/00* | (2006.01) | |
| *G01V 1/30* | (2006.01) | |
| *G01V 1/34* | (2006.01) | |
| *G01V 1/36* | (2006.01) | |

(52) U.S. Cl.
CPC .............. *G01V 1/282* (2013.01); *G01V 1/003* (2013.01); *G01V 1/30* (2013.01); *G01V 1/345* (2013.01); *G01V 1/364* (2013.01); *G01V 2210/51* (2013.01); *G01V 2210/74* (2013.01)

(58) Field of Classification Search
CPC .......... G01V 1/282; G01V 1/003; G01V 1/30; G01V 1/345; G01V 1/364; G01V 2210/51; G01V 2210/74
See application file for complete search history.

(56) References Cited

U.S. PATENT DOCUMENTS

| | | |
|---|---|---|
| 8,619,498 B2 | 12/2013 | Xu et al. |
| 8,760,967 B2 | 6/2014 | Nichols et al. |
| 8,965,059 B2 | 2/2015 | Winbow et al. |
| 9,250,341 B2 | 2/2016 | Tang et al. |
| 10,408,958 B2 | 9/2019 | Schneider, Jr. |

OTHER PUBLICATIONS

Graham Cain et al., Reducing riskin seismic acquisition and interpretation of complex targets using a Gocad-based 3D modeling tool, 1998 SEG Expanded Abstracts, pp. 1-4 (Year: 1998).*

Casey Kuo et al., Seismic reflection processing in spherical geometries: Lab, field, and whole Earth cases, 2021 Society of Exploration Geophysicists, First International Meeting for Applied Geoscience & Energy, pp. 2600-2604 (Year: 2021).*

(Continued)

*Primary Examiner* — Mischita L Henson
(74) *Attorney, Agent, or Firm* — Patent Portfolio Builders PLLC (57) ABSTRACT

Seismic exploration of an underground formation uses seismic excitations to probe the formation's properties such as reflectivity that can be imaged using reverse time migration. Using an equal area spherical binning at reflection points improves and simplifies RTM imaging together with adaptability to the data acquisition geometry, while overcoming drawbacks of conventional cylindrical binning.

20 Claims, 8 Drawing Sheets

(56) References Cited

OTHER PUBLICATIONS

Robert Pereira et al., RTM 3D angle gathers for OBN data using an equal area spherical binning method, Sep. 2021 First International meeting for Applied Geoscience & Energy Expanded Abstracts, Abstract, https://doi.org/10.1190/segam2021-3585025.1 (Year: 2021).*

Ali Tura et al., "3-D AVO migration/inversion of field data," The Leading Edge, Nov. 1998, pp. 1578-1583, vol. 17, No. 11.

Bing Tang et al., "Aliasing In RTM 3D Angle Gathers," Society of Exploration Geophysicists, SEG San Antonio 2011 Annual Meeting, 2011, pp. 3310-3314.

Biondo Biondi et al., "Angle-domain common-image gathers for migration velocity analysis by wavefield-continuation imaging," Geophysics, 2004, pp. 1283-1298, vol. 69, No. 5.

Cory Ahrens et al, "Rotationally invariant quadratures for the sphere," Proceedings of the Royal Society, 2009, pp. 3103-3125, vol. 465.

K. M. Gorski et al., "HEALPix: A framework for high-resolution discretization and fast analysis of data distributed on the sphere," The Astrophysical Journal, 2005, pp. 759-771, vol. 622, No. 2.

Kwangjin Yoon, "Reverse-time migration using the Poynting vector," Exploration Geophysics, 2006, pp. 102-107, vol. 37.

Madhav Vyas et al., Efficient RTM angle gathers using source directions SEG San Antonio 2011 Annual Meeting, pp. 3104-3108.

Max Tegmark, "An icosahedron based method for pixelizing the celestial sphere" The Astrophysical Journal Letters, 1996, pp. 1-12, vol. 470, No. 2.

P.C. Docherty et al., "Angle Gathers and Images from Sparse OBN Data," 78th EAGE Conference and Exhibition, 2016, 5 pages.

Sheng Xu et al., "3D angle gathers from reverse time migration," Geophysics, Mar. 2011, pp. S77-S92, vol. 76, No. 2.

Sheng Xu et al., "Common-angle migration: A strategy for imaging complex media," Geophysics, 2001, pp. 1877-1894, vol. 66, No. 6.

W. A. Mulder et al., "A comparison between one-way and two-way wave-equation migration," Geophysics, 2004, pp. 1491-1504, vol. 69, No. 6.

* cited by examiner

RTM USING EQUAL AREA SPHERICAL BINNING FOR GENERATING IMAGE ANGLE GATHERS

TECHNICAL FIELD

Embodiments of the subject matter disclosed herein generally relate to seismic exploration in which seismic data is processed using reverse time migration, RTM, with an equal area spherical binning technique to generate image angle gathers.

DISCUSSION OF THE BACKGROUND

Seismic exploration refers to acquiring and processing land or marine seismic data to generate a profile (image) of the underground geophysical structure. Based on this profile, those trained in the field evaluate the likelihood of the presence and approximate location of exploitable oil and/or gas (i.e., hydrocarbons) or other minerals of interest. Therefore, improving seismic exploration to obtain images of increasingly higher resolution is an ongoing technical research objective.

Figure 1:
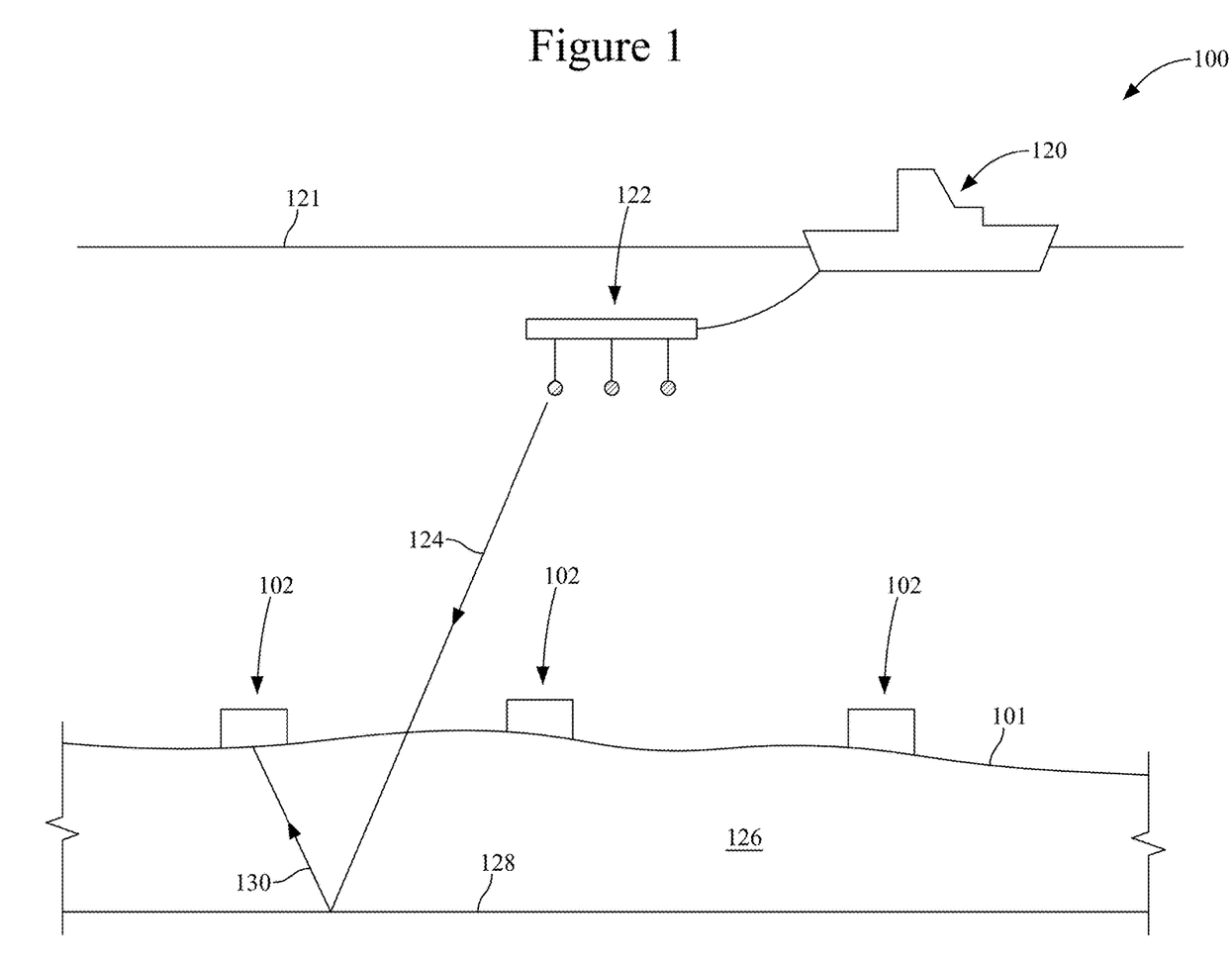
FIG. 1 illustrates ocean bottom nodes used in acquiring seismic data.

Marine seismic data may be acquired with ocean bottom nodes (OBNs) placed in two-dimensional arrangements on the seafloor (e.g., rectangular grids with cell size ranging from 400×400 m in deepwater ocean at thousands of meters depth, to 50×50 m at tens to hundreds on meters depth). FIG. 1 is a vertical view of a seismic acquisition system 100 that includes plural OBNs 102 distributed over the ocean bottom 101. Each OBN 102 includes a sensor (e.g., a hydrophone sensing pressure waves) configured to detect seismic excitations emerging from the underground formation 126, and to convert detected seismic excitations into seismic data. A vessel 120 tows a seismic source 122 under the ocean surface 121. The seismic source 122 is configured to generate seismic excitations 124 that propagate through water and then penetrate the formation 126, where they get reflected and/or refracted at various interfaces such as 128. The reflected seismic excitation 130 is detected by one of the OBNs 102. Seismic data generally consists of series of amplitudes and times recorded at a known detection position (receiver information) after a seismic excitation was emitted at a known shot position and time (source information). Simplistically, an amplitude peak occurring after a direct arrival time (i.e., the time interval for a seismic excitation to propagate straight/directly from the source to the receiver) indicates detection of a reflection inside the underground formation, and, thus, the location of a reflection viewed through of a velocity model of the formation.

One approach to seismic data processing is to build an image of the subsurface in view of the seismic data acquisition geometry and a velocity model using a reverse time migration (RTM) engine. A forward propagating wavefield characterizes propagation of a seismic excitation from the source into the subsurface, while a backward propagating wavefield backtracks the detected excitation's propagation through the subsurface to the receiver. These wavefields enable applying an imaging condition, such as, the wavefields meet at a reflection location in the subsurface. The reflection point locations and respective angles between the wavefields are output as image angle gathers (bins) associated with different locations in the subsurface. The density of data thus grouped forms an image of the subsurface (here "image" should not be limited to the two-dimensional meaning of the term instead referring to a multi-dimensional collection of information). This image is usable for further analysis such as amplitude versus offset (AVO) analysis or amplitude versus azimuth (AVAZ) analysis (as described, for example, in the article "3-D AVO migration/inversion of field data" by A Tura et al. published in *The Leading Edge* of November 1998) and migration velocity analysis (as described, for example, in the 2004 article "Angle-domain common-image gathers for migration velocity analysis by wavefield-continuation imaging" by B. Biondi and W. W. Symes published in *Geophysics* Vol. 69, No. 5, pp. 1283-1298).

Angle gather output from RTM is sensitive to data sampling (as discussed in the article "Aliasing in RTM 3D Angle Gathers" by Tang, B. et al., published in *SEG Technical Program Expanded Abstracts* 2011, pp. 3310-3314), an issue that is particularly pronounced in the case of OBN acquisitions (see the article "Angle Gathers and Images from Sparse OBN Data" by Docherty, P. C. and Schneider Jr., W. A., published in 78*th EAGE Conference and Exhibition* 2016, We STZ1 08, pp. 1-5). Typical node separation requires the use of coarser angular bins, which in turn forces a proper binning of the reflection energy around a given image point.

The process of obtaining angle gathers from RTM at given image point A at position x is described by the following time-domain equation (which can be inferred based on the 2011 article "3D angle gathers from reverse time migration" by Xu et al., published in *Geophysics*, Vol. 76, No. 2, pp. S77-S92):

$$I_s(x;\theta^*,\phi^*) = \Sigma_t W_{\theta^*,\phi^*}(\theta(x,t),\phi(x,t)) p_F(x,t) p_B(x,t) \quad (1)$$

where forward- and back-propagated wavefields $p_F(x, t)$ and $p_B(x, t)$ (with x being a vector location and t time) are cross-correlated to form the image $I_s$ for a collection of traces with a common reflection point. The incident angle $\theta(x, t)$ and the azimuth $\phi(x, t)$ between the forward- and back-wavefields are computed and binned with the help of the binning function $W_{\theta^*,\phi^*}$, where the pair $(\theta^*,\phi^*)$ represents an angle bin's center. Since the conventional bins are defined in cylindrical coordinates, the binning function is proportional to $1/\sin \theta^*$ to compensate for the bins becoming smaller as they approach the pole ($\theta^*=0$).

Figure 2:
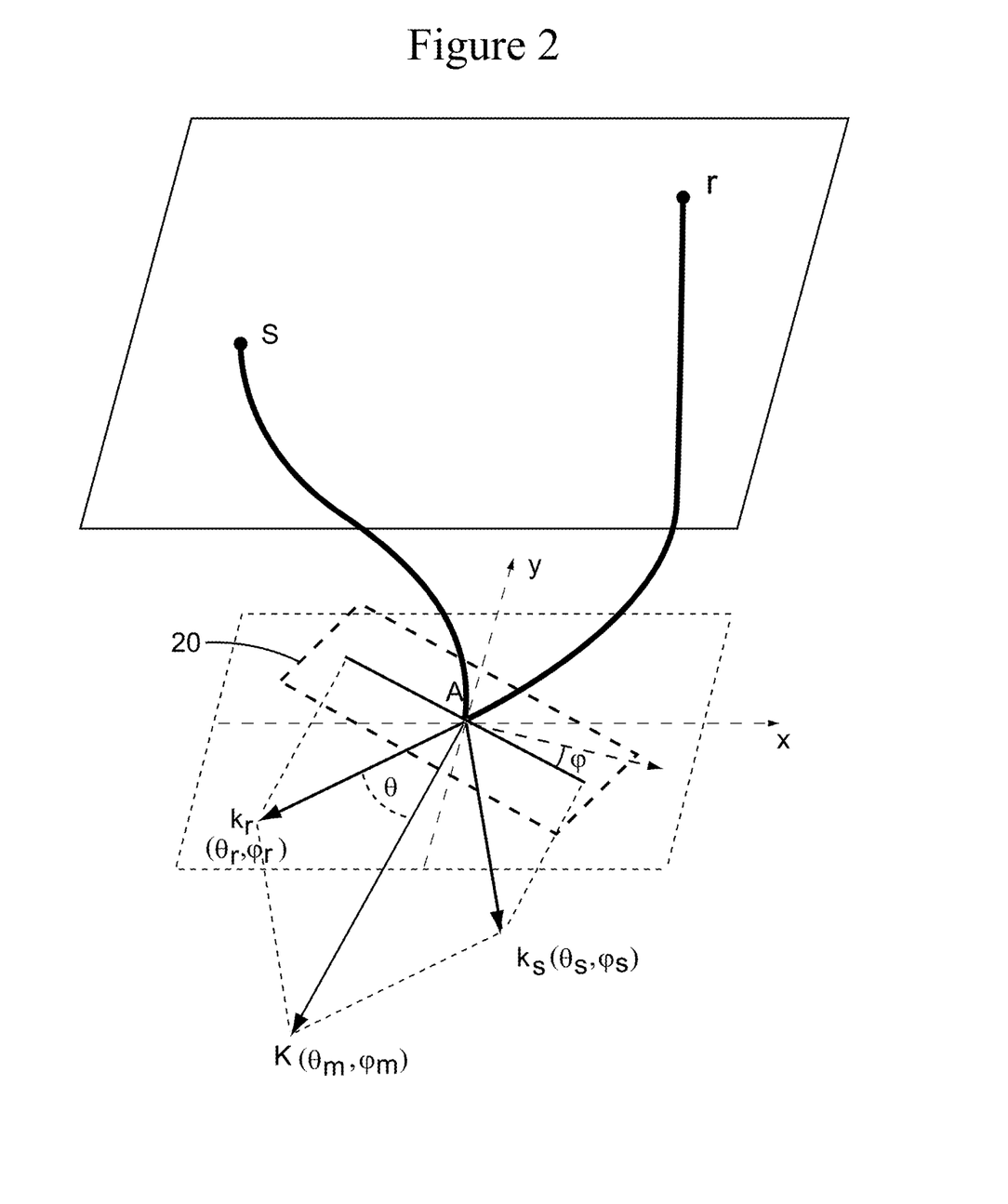
FIG. 2 illustrates incident and azimuth angle at a reflection point.

FIG. 2 is a schematic diagram illustrating definition of a reflection angle $\theta$ and a local subsurface azimuth angle $\phi$ at a reflection point A. In 3D true-amplitude migration with subsurface angle gather output formulation framework, the reflectivity at subsurface location x is a function of $\theta$ and $\phi$. In FIG. 2, the source s may be any known source (e.g., gun or vibrator) and the receiver at r may be any known receiver (e.g., geophone, hydrophone, etc.). The wavenumber vectors $k_s$ and $k_r$ are defined at image location x for the forward-propagated wavefield from the source location and the backward-propagated wavefield reconstructed from the receiver location, respectively. The angle pairs $(\theta_s, \phi_s)$, $(\theta_r, \theta_r)$, and $(\theta_m, \phi_m)$ are, respectively, the incident angles and azimuth angles of vectors $k_s$, $k_r$, and their vector sum K, respectively. According to Snell's law, the plane 20, which is orthogonal to vector K, is a reflector plane (which coincides with an actual reflector for a specular reflection).

Regardless of the method used to compute the angles, the choice of binning function $W_{\theta^*,\phi^*}$ affects the overall quality and amplitude's behavior of the image gather. Therefore, the binning function is chosen to represent, according to the best known way, the sampling of reflection energy around the image point, which in its turn depends on the data sampling defined by acquisition. In the case of sparse OBN acquisitions, the coarser the data sampling, the more sensitive the results with respect to the choice of binning function. The use of cylindrical coordinates tends to over-sample the near angles while under-sampling the far angles.

Figure 3:
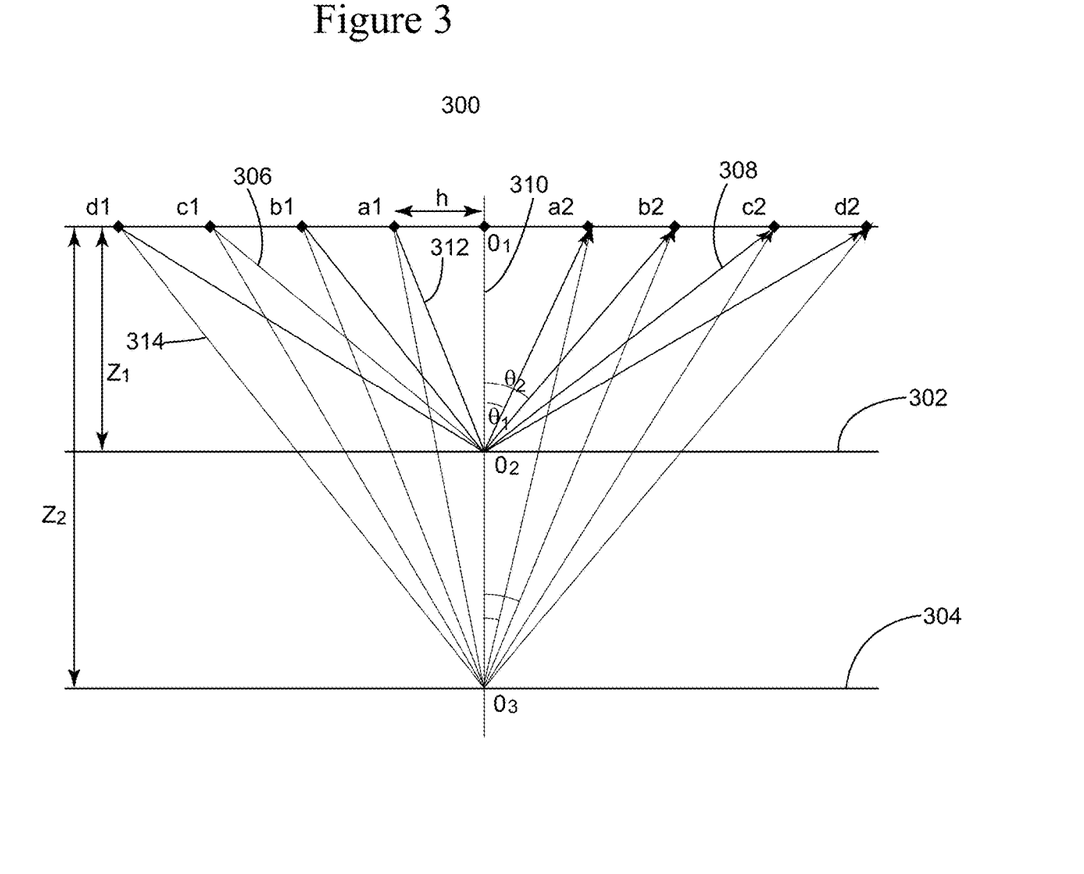
FIG. 3 illustrates incident angle ranges' dependence on interface depths.

FIG. 3 exemplarily illustrates this sampling issue. A medium constant velocity medium 300 has horizontal reflectors 302 at depth $z_1$ and 304 at depth $z_2$. A wave 306 emitted from a surface point c1 is reflected at $O_2$ of reflector 302, and the reflected wave 308 reaches the surface point c2. Similar wave paths are shown for different surface points and for both reflectors. It is noted that waves, e.g., 312, closer to the vertical line 310 correspond to near angles, while waves, e.g., 314, further away from the vertical line 310 correspond to far angles. The range of angles for the reflector closer to the surface 302 is larger than for the deeper reflector 304.

Figure 4:
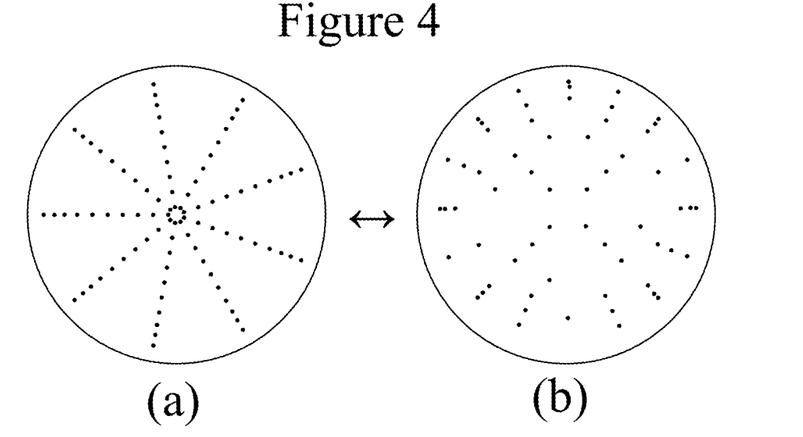
FIG. 4 shows two-dimensional projections of incident azimuth angle pairs obtained using (a) a conventional cylindrical coordinates approach versus (b) a source-centric binning on an icosahedron.

The article "Efficient RTM angle gathers using source directions" by Vyas et al. (published in SEG San Antonio 2011 Annual Meeting, pp. 3104-3108) proposes a source-centric binning on an icosahedron as prescribed in the article "An icosahedron-based method for pixelizing the celestial sphere" by M. Tegmark, published in *The Astrophysical Journal Letters*, 470(2), L81. This binning involves an area equalization step in order to compensate for different bin sizes. FIG. 4 shows the improvement of this source-centric binning (b) versus the conventional approach (a) in a two-dimensional projection of incident angle/azimuth pairs. Vyas's approach is original but can be improved. One drawback of Vyas's approach is that it is not adaptable to different acquisition geometries.

There is still a need to propose methods and systems that efficiently achieve angular binning for RIM while avoiding the drawbacks and limitations of conventional approaches. All the articles mentioned in this background section are incorporated by reference in their entirety.

SUMMARY

Methods and apparatuses according to various embodiments perform seismic exploration of underground formations in which an equal area spherical binning at reflection points improves and simplifies RTM imaging providing adaptability to the data acquisition, while overcoming drawbacks of conventional cylindrical binning.

According to an embodiment there is a method for seismic exploration of an underground formation that includes obtaining seismic data representing seismic excitations emitted from a source position and detected at a receiver position after traveling through the underground formation. The method further includes processing the seismic data using an RTM method to generate image angle gathers, wherein with an equal area spherical binning technique is employed to define incident and azimuth angle bins at reflection points, and the image angle gathers are used to generate the underground formation image enabling to determine the presence of hydrocarbons and/or other minerals.

According to another embodiment there is a seismic data processing apparatus having an interface and a data processing unit. The interface is configured to obtain seismic data representing seismic excitations emitted from a source position and detected at a receiver position after traveling through the underground formation. The data processing unit is connected to the interface and configured to process the seismic data using an RTM method to generate image angle gathers, wherein with an equal area spherical binning technique is employed to define incident and azimuth angle bins, and the image angle gathers are used generate the underground formation images enabling to determine the presence of hydrocarbons and/or other minerals.

According to yet another embodiment there is a computer readable recording medium storing executable codes, which, when executed on a computer make the computer perform a method for seismic exploration of an underground formation. The method includes obtaining seismic data representing seismic excitations emitted from a source position and detected at a receiver position after traveling through the underground formation. The method further includes processing the seismic data using an RTM method to generate image angle gathers, wherein with an equal area spherical binning technique is employed to define incident and azimuth angle bins at reflection points, and the image angle gathers are used generate the underground formation image enabling to determine the presence of hydrocarbons and/or other minerals.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

The embodiments described in this section process seismic data using RTM with an equal area spherical binning technique that defines reflection angle bins at any reflection point. The workflow can be summarized as follows:

1) Initiate partial images $I_p$ associated to bi-angular bins defined for reflection points using an equal area spherical binning technique;

2) Compute forward and backward propagated wavefields;
3) Apply imaging condition in any given domain. For each point in this domain
   i. Compute incident and azimuth angles between the forward and backward wavefields computed in (2) (and transformed in another domain if needed);
   ii. Identify center p of a bi-angular bin at the reflection point, p being closest to the pair of incident and azimuth angles computed in (i);
   iii. Add data point to the partial image $I_p$ initialized in (1) with the center at p as identified in (ii);
4) Optionally, interpolate to an arbitrary set of points on the sphere.

The bin definition in 1) is independent of locations in the subsurface or seismic data but the bin definition is selected to best fit the data acquisition. The bins are bi-angular in the sense that each bin covers a range in θ (incidence angle at a reflection point) and a range in φ (azimuth angle at a reflection point). In other words, step 1) splits the RTM image of the underground formation I(x) in partial images $I_p(x)$ associated with equal area spherical bins.

The steps 2) and 3) are repeated for each shot or any given subset of the seismic data used to compute the forward and backward wavefields. In the case of a streamer acquisition this subset is usually taken to be the collection of traces corresponding to a single shot position, while in the case of OBN acquisitions it is taken as the collection of traces for a single receiver position. In the OBN case, the forward wavefield is calculated from the receiver position and the backward wavefield is calculated from the source positions. This swap of source and receiver positions is possible due to the principle of reciprocity.

Figure 5:
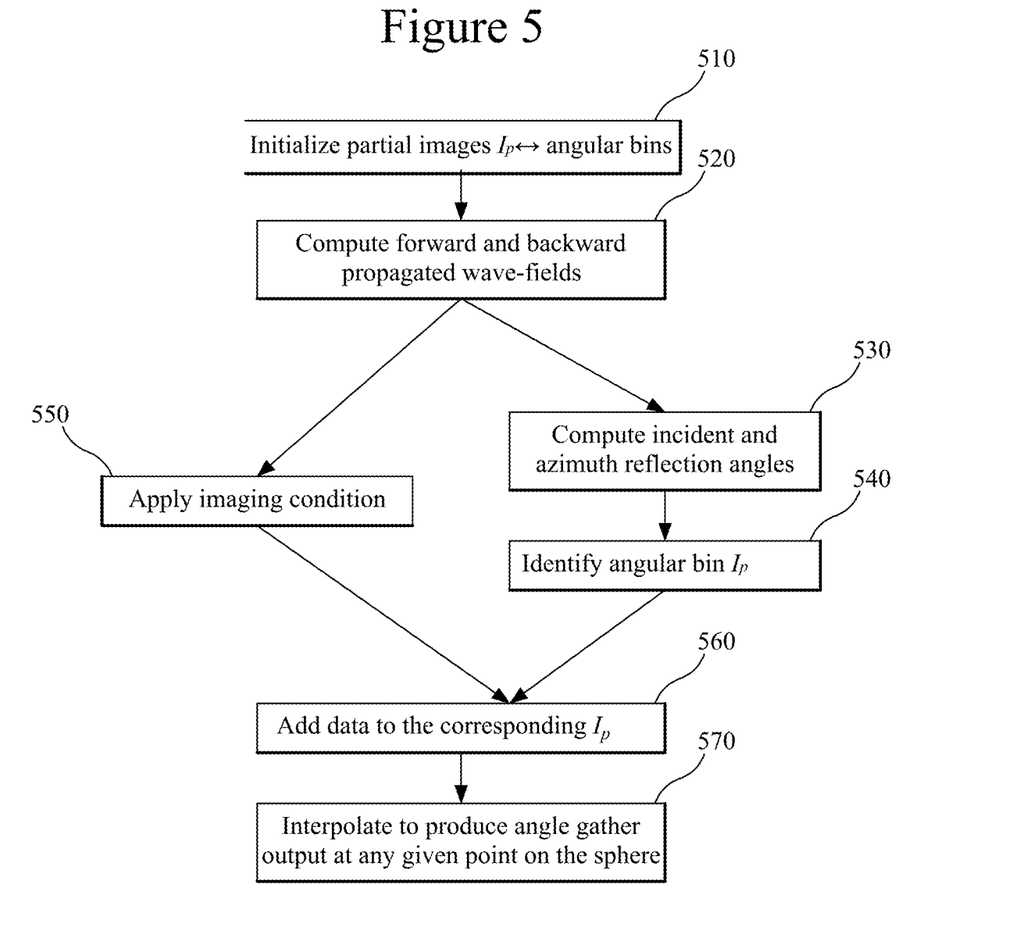
FIG. 5 is flowchart of a method using equal area spherical binning for RTM angle gathers according to an embodiment.

As illustrated in FIG. 5, first, partial images $I_p$ are initialized at 510. Each of the partial images corresponds to a specific one of the equal area spherical bins (the center of the bi-angular bin being θ*, φ*):

$$I_p(x) := I(x; \theta^*, \phi^*). \quad (2)$$

Figure 6:
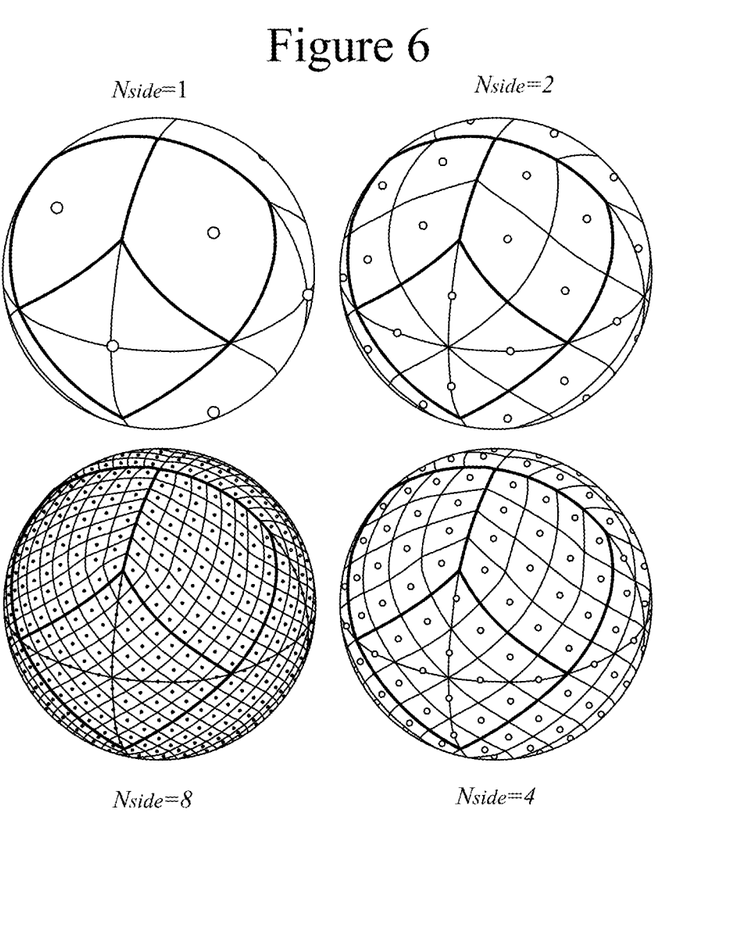
FIG. 6 illustrates spheres with different numbers of bins.

An equal area spherical binning algorithm, Hierarchical Equal Area Isolatitude Pixelization, was described in the 2005 article "HEALPix: A framework for high-resolution discretization and fast analysis of data distributed on the sphere" by Gorski et al., published in *The Astrophysical Journal*, 622(2), pp. 759-771 (which is incorporated herein by reference in its entirety). HEALPix is a binning procedure based on three integer parameters: $N_\theta$, $N_\phi$ and $N_{side}$. $N_\theta$ and $N_\phi$ define a base configuration. $N_{side}$ defines the level of refinement of each base configuration (for the base configuration $N_{side}=1$), $N_{side}$ indicating the number of divisions along the side of a base-resolution pixel. FIG. 6 (corresponding to FIG. 3 from Gorski's article) illustrates spheres binned using HEALPix with different values of $N_{side}$.

In one embodiment, pixel (center of the bin) positions for $N_\theta$ is given by an odd integer (in tests 3 has been used). Note that even integer is also possible in other embodiments. With odd $N_\theta$, the bins are divided in two regions, according to whether they are close to the pole or to the equator and are indexed by two integers: the first integer defines which ring of constant latitude the bin belongs to, while the second identifies the bin inside the ring. For the polar regime, the ring number i ranges between 1 and ($N_{side}-1$) and for each ring the second number j ranges between 1 and $N_\phi i$. A combined pixel number can be defined as $p = j-1+N_\phi i(i-1)/2$. The bin center positions for the polar regime are given in terms of φ and z≡cos θ:

$$z = 1 - (1-z^*)\frac{i^2}{N_{side}^2}; \phi = \frac{2\pi}{N_\phi i}\left(j - \frac{1}{2}\right). \quad (3)$$

where $z^* = (N_\theta - 1)/N_\theta$ defines the separation between polar and equatorial regimes. A similar expression can be written for the equatorial regime. In the equatorial regime, the ring number i takes values from $N_{side}$ to ... $N_{side}(N_\theta+1)/2$ and the second number j is between 1 and $N_\phi N_{side}$. The combined pixel number is given by $p = N_\phi N_{side}(N_{side}-1)/2 + N_\phi N_{side}(i - N_{side}) + j - 1$. Bin positions are given by:

$$z = z^*\left(1 - \frac{2(i - N_{side})}{N_{side}(N_\theta - 1)}\right) \text{ and} \quad (4)$$

$$\phi = \frac{2\pi}{N_\phi N}\left(j - \frac{s}{2}\right) \text{ with } s = (i - N_{side} + 1) \bmod 2.$$

The transition between polar and equatorial regimes is given by $i = N_{side}$, in which case $z = z^*$. The number of azimuths in the ring closest to the pole is given by $N_\phi$. This number increases in the polar region until it reaches the equatorial regime, and then it remains constant. The total number of pixels in the northern hemisphere, including the equator, is given by:

$$N_{pix}^H = N_\phi(N_{side}(N_{side}-1)/2 + N_{side}^2(N_\theta-1)/2 + N_{side}). \quad (5)$$

The total number of pixels on the full sphere is given by:

$$N_{pix} = N_\phi N_\theta N_{side}^2. \quad (6)$$

Figure 7:
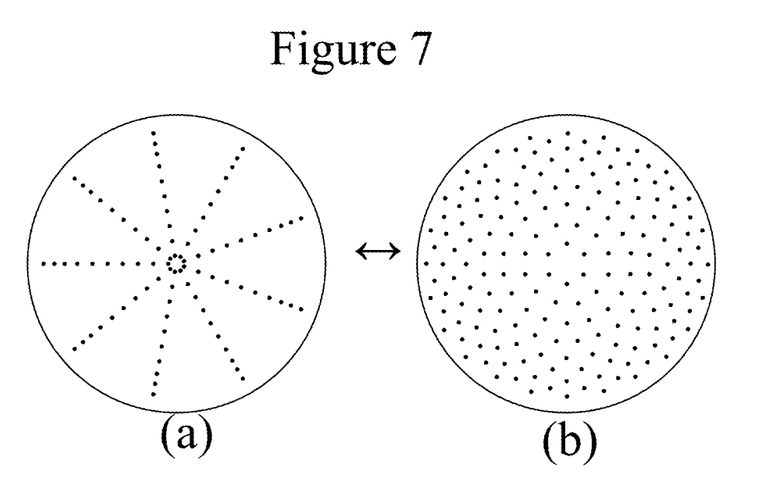
FIG. 7 shows two-dimensional projections of incident and azimuth angle pairs obtained using (a) a conventional cylindrical coordinates approach versus (b) an equal area spherical binning according to an embodiment.

Similar to FIG. 4, FIG. 7 shows two-dimensional projections of incident azimuth angle pairs obtained using (a) a conventional cylindrical coordinates approach versus (b) an equal area spherical binning according to an embodiment. The equal area spherical binning provides a more equal distribution of the bin centers and is therefore better suited to describe a full azimuth seismic data acquisition such as the one using OBN.

Returning now to FIG. 5, after a partial image is associated with each bi-angular bin at 510, for each reflection identified in the seismic data, forward and backward propagated wavefields (i.e., $p_F$ and $p_B$) are calculated at 520. Then, on one hand, azimuth and reflection angles θ and φ are computed at 530 to then identify the spherical bin (i.e., the closest pair θ*, φ* to θ and φ) at 540. On the other hand, step 520 also allows applying an imaging condition for a given domain point at 550. The image condition may be applied in space time domain or in another domain such as in wavenumber domain (in the latter case, the wavefields being transformed to and back this other domain).

At 560, the result of the imaging condition is added to the partial image $I_p$ corresponding to the identified bin at that particular data domain point.

Optionally, at 570, one may interpolate any contribution to refine the angle gather outputs for any point on the sphere.

The image I of the underground formation is the sum of all partial images $I_p$:

$$I(x) = \Sigma_p w_p I_p(x) \quad (10)$$

weights $w_p$ being constant and equal to $4\pi/N_{pix}$ if the bins have equal areas, but having to account for the area differences if the original equal area bins have been converted to other bins at 570.

The binning procedure explained relative to step 510 defines a partition of the (hemi-)sphere, which can in turn be used to approximate integrals of functions defined on it. In particular, an interpolation formula may yield the value of a function at an arbitrary point of a bin on the sphere, given the function's value for the bin's center. One version of the interpolation formula is:

$$f(\hat{r}_q) \approx \sum_p f(\hat{r}_p) t_{qp} \tag{7}$$

with $$t_{qp} = \frac{1}{N_{pix}} \sum_{l=0}^{l_{max}} (2l+1) P_l(\hat{r}_q \cdot \hat{r}_p). \tag{8}$$

where q identifies an arbitrary position on the sphere given by $\hat{r}_q$, the set $\{\hat{r}_p\}$ is defined on the HEALPix pixel positions and $P_l(x)$ is the Legendre polynomial of degree l. The interpolation matrix $t_{qp}$ plays the role of the sinc interpolator on the sphere. It is defined as a sum of Legendre polynomials that depend only on the dot product between $\hat{r}_q$ and the set of $\hat{r}_p$. The sum over l in the definition of $t_{qp}$ is bounded by a parameter $l_{max}$ that depends on the particular binning chosen (i.e., on the combination $N_\theta$, $N_\varphi$, $N_{side}$) and needs to be estimated. An estimate of $l_{max}$ is proposed in the 1996 article "An icosahedron-based method for pixelizing the celestial sphere" by M. Tegmark (published in *The Astrophysical Journal Letters;* 470 (2), L81, which is incorporated herewith by reference in its entirety):

$$l_{max} \approx \sqrt{3 N_{pix}}. \tag{9}$$

As an option, a percentage of this estimate may be used and tested for each binning configuration and data.

In real and simulated data tests, different values sets ($N_\theta$, $N_\varphi$, $N_{side}$) have been used for a rectangular grid of OBNs. These parameters may be adjusted to adapt for different acquisition geometries (for instance, hexagonal receiver grid versus rectangular grid). $N_{side}$ defines the level of refinement starting from this base configuration. In our case, since reflection angles are defined up to 90°, in fact only half of the sphere is used, with a total number of pixels $N_{pix}^H$, given in equation (5). The ($N_\theta$, $N_\varphi$, $N_{side}$)=(3, 4, 6) as an average incident angle increment of about 7.6°, while the ($N_\theta$, $N_\varphi$, $N_{side}$)=(3, 4, 8) has an average incident angle increment of about 5.8°. These configurations were compared with a cylindrical coordinates binning of 5° incident and 9° azimuth sectors. The improvement in angular coverage in each bin was visible, with the configuration (3, 4, 6) showing even better continuity of events while still capturing variations in incident angle and azimuth.

Figure 8:
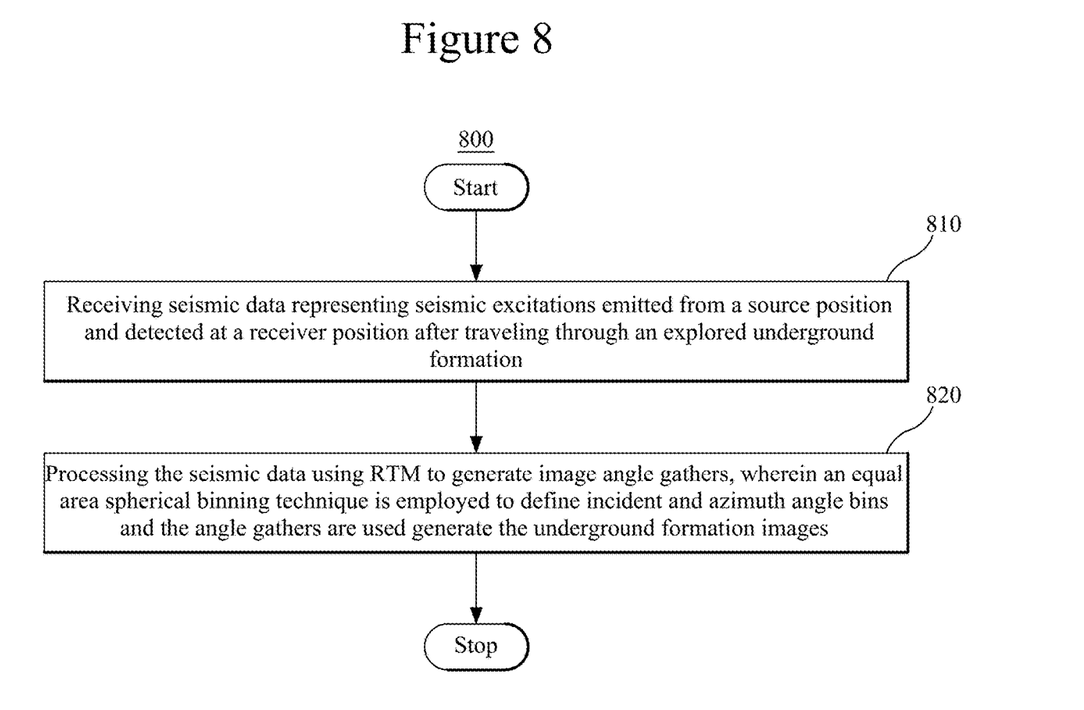
FIG. 8 is a flowchart of a method of seismic exploration according to an embodiment.

FIG. 8 illustrates a method of seismic exploration 800. Method 800 includes obtaining seismic data representing seismic excitations emitted from a source position and detected at a receiver position after traveling through an explored underground formation, at 810. Data acquisition geometry may be the one illustrated in FIG. 1, but it is not limited to OBN type of acquisition, method 800 being applicable to any type of land and marine data acquisition.

Method 800 further includes processing the seismic data using RTM to generate image angle gathers at 820, wherein an equal area spherical binning technique is employed to define incident and azimuth angles at reflection points, and the image angle gathers. The image angle gathers are used to determine the presence of hydrocarbons and/or other minerals.

If the equal area spherical binning technique is HEALPix, then it is determined by three numbers: one of the three numbers indicates a number of bins on each side of an equal area of a base configuration, and other two of the three numbers characterizing incident and azimuth angle bins, respectively. Method 800 may further include selecting a combination of the three numbers using a subset of the seismic data, the three numbers being varied within predetermined value ranges (e.g., ($N_\theta$, $N_\varphi$, $N_{side}$) may be within (2-10, 2-12, 4-20)) to identify the combination yielding a best achievable bi-angular binning for a seismic data acquisition system used to acquire the seismic data.

In one embodiment, step 820 includes, for each series of amplitude versus time series recorded at the receiver position following one of the seismic excitations emitted at the source position performing: initializing a set of partial images, computing a forward-propagated wavefield from the source position through the underground formation and a backward-propagated wavefield from the receiver position through the underground formation, applying an imaging condition to estimate a reflection location using the forward-propagated wavefield and the backward-propagated wavefield, computing incident and azimuth reflection angles at the reflection location, and identifying one of the angular bins defined by the equal area spherical binning technique with a bin center closest to the incident and azimuth reflection angles; and adding the data point to the identified angular bin. Here, the incidence and azimuth reflection angles may be calculated in a wavenumber domain, the forward and backward-propagated wavefields being transformed in the wavenumber domain using an anti-leakage Fourier transform, and angle domain image gathers being converted back in a space domain by applying a fast Fourier transform. Alternatively, the incidence and azimuth reflection angles may be calculated using derivatives of the wavefields.

Method 800 may further include interpolating the image angle gathers to generate another set of image angle gathers at positions different from bin centers of bins as defined by the equal area spherical binning technique.

Method 800 may also include using migration velocity analysis to update a model used to compute the forward-propagated wavefield and the backward-propagated wavefield.

The use of equal area spherical binning solves the over-sampling of the region around the pole that plagued conventional cylindrical binning. Since all bins have the same area, area equalization is no longer necessary. In HEALPix, the bins are organized in rings of constant latitude, which simplifies the computation of Legendre polynomials used in the analysis of the binned data.

Figure 9:
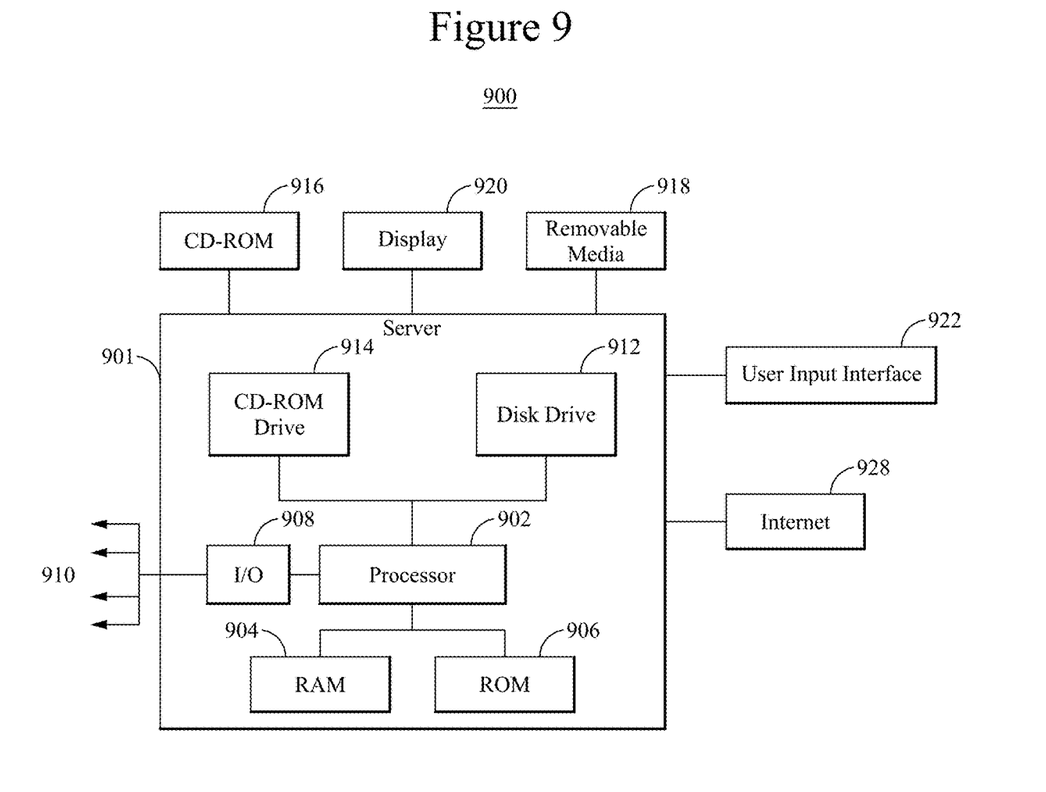
FIG. 9 is a schematic diagram of a data processing apparatus according to an embodiment.

The above-discussed methods may be implemented in a computing device 900 as illustrated in FIG. 9. Hardware, firmware, software or a combination thereof may be used to perform the various steps and operations described herein.

Exemplary computing device 900 suitable for performing the activities described in the exemplary embodiments may include a server 901. Server 901 may include a central processor (CPU) 902 coupled to a random-access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, detectors, etc. The server may be part of a larger network configuration, as in a global area network (GAN) such as the Internet 928, which allows ultimate connection to various computing devices.

The spherical binning may also be used with one-way wave equation migration (OWEM) instead of RTM and with Kirchhoff migration. The only modification of the methods illustrated in FIGS. 5 and 8 for OWEM is in the manner of propagating the forward and backward wavefields. That is, the OWEM forward- and backward-propagated wavefields are computed using a downward continuation method such that the image corresponds to a one-way wave equation migration. This difference between the OWEN and RTM wavefields is described in the 2004 article "A comparison between one-way and two-way wave-equation migration" by W. A. Mulder and R.-E. Plessix published in *Geophysics*, Vol. 69, No. 6, pp. 1491-1504, which is incorporated herein by reference in its entirety.

Kirchhoff migration corresponds to an asymptotic version of RTM, for large frequencies. Kirchhoff angle gathers have been introduced in the 2001 article "Common-angle migration: A strategy for imaging complex media" by S. Xu et al. published in *Geophysics*, Vol. 66, No. 6, pp. 1877-1894, which is also incorporated herein by reference in its entirety. Because of the asymptotic approximation, the implementation in the Kirchhoff case is very different. Instead of propagating wavefields from receiver and source locations, ray-tracing is used to compute travel-times between source or receiver location to any location at the sub-surface.

As far as binning is concerned, Kirchhoff migration does not cause major differences relative to RTM. The directions of the rays coming from source and receiver locations are available through ray-tracing, which allows computing incident or azimuth angles at any sub-surface location, angle that are then input for the spherical binning.

The embodiments described in this section provide methods and apparatuses using equal area spherical binning for generating angle gathers. It should be understood this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. Other examples that occur to those skilled in the art are intended to be within the scope of the disclosed inventions.

What is claimed is:

1. A method for seismic exploration of an underground formation, the method comprising:
   obtaining seismic data representing seismic excitations emitted from a source position and detected at a receiver position after traveling through the underground formation; and
   processing the seismic data using a reverse time migration, RTM, method to generate image angle gathers, wherein with an equal area spherical binning technique is employed to define incident and azimuth angle bins at reflection points, and the image angle gathers are used to generate the underground formation image enabling to determine the presence of hydrocarbons and/or other minerals.

2. The method of claim 1, wherein the equal area spherical binning technique is determined by three numbers: two numbers characterize a base angular configuration, and a third number indicates a number of divisions on each side of a bin of the base angular configuration.

3. The method of claim 2, further comprising:
   selecting a combination of the three numbers using a subset of the seismic data, the three numbers being varied within predetermined value ranges to identify the combination yielding a best achievable angular binning for a seismic data acquisition system used to acquire the seismic data.

4. The method of claim 1, wherein the processing of the seismic data using RTM with the equal area spherical binning comprises:
   initializing partial images corresponding to angular bins; and
   for each collection of seismic traces in the seismic data from the same source position or the same receiver position:
      computing a forward-propagated wavefield from the source position through the underground formation and a backward-propagated wavefield from the receiver position through the underground formation,
      applying an imaging condition in a given domain, using the forward-propagated wavefield and the backward-propagated wavefield for each point in the given domain
      computing incident and azimuth reflection angles between forward and backward wavefields,
      identifying one of the angular bins defined by the equal area spherical binning technique with a bin center closest to the incident and azimuth reflection angles; and
      adding a result of the imaging condition in the given domain point to one of the partial images corresponding to the one of the angular bins.

5. The method of claim 4, wherein the incidence and azimuth reflection angles are calculated in a wavenumber domain, the forward and backward-propagated wavefields being transformed in the wavenumber domain using an anti-leakage Fourier transform, and angle domain image gathers being converted back in a space domain by applying a fast Fourier transform.

6. The method of claim 4, wherein the incidence and azimuth reflection angles are calculated using derivatives of the wavefields.

7. The method of claim 1, further comprising:
interpolating the image angle gathers to generate another set of image angle gathers at positions different from bin centers of bins as defined by the equal area spherical binning technique.

8. The method of claim 1, further comprising:
using the image angle gathers to update a model used to compute the forward-propagated wavefield and the backward-propagated wavefield.

9. A seismic data processing apparatus comprising:
an interface configured to obtain seismic data representing seismic excitations emitted from a source position and detected at a receiver position after traveling through the underground formation; and
a seismic data processing unit connected to the interface and configured to process the seismic data using a reverse time migration, RTM, method to generate image angle gathers, wherein with an equal area spherical binning technique is employed to define incident and azimuth angle bins, and the image angle gathers are used generate the underground formation images enabling to determine the presence of hydrocarbons and/or other minerals.

10. The seismic data processing apparatus of claim 9, wherein the equal area spherical binning technique is determined by three numbers: two numbers characterize a base angular configuration, and a third number indicates a number of divisions on each side of a bin of the base angular configuration.

11. The seismic data processing apparatus of claim 10, wherein the seismic data processing unit is configured to select a combination of the three numbers using a subset of the seismic data, the three numbers being varied within predetermined value ranges to identify the combination yielding a best achievable angular binning for a seismic data acquisition system used to acquire the seismic data.

12. The seismic data processing apparatus of claim 9, wherein, when processing of the seismic data using RTM with the equal area spherical binning, the seismic data processing unit performs:
initializing partial images corresponding to angular bins; and
for each collection of seismic traces in the seismic data from the same source position or the same receiver position:
computing a forward-propagated wavefield from the source position through the underground formation and a backward-propagated wavefield from the receiver position through the underground formation,
applying an imaging condition in a given domain, using the forward-propagated wavefield and the backward-propagated wavefield for each point in the given domain
computing incident and azimuth reflection angles between forward and backward wavefields,
identifying one of the angular bins defined by the equal area spherical binning technique with a bin center closest to the incident and azimuth reflection angles; and adding a result of the imaging condition in the given domain point to one of the partial images corresponding to the one of the angular bins.

13. The seismic data processing apparatus of claim 12, wherein the seismic data processing unit calculates the incidence and azimuth reflection angles in a wavenumber domain, transforms the forward and backward-propagated wavefields in the wavenumber domain using an anti-leakage Fourier transform, and angle domain image gathers are converted back in a space domain by applying a fast Fourier transform.

14. The seismic data processing apparatus of claim 12, wherein the seismic data processing unit calculates the incidence and azimuth reflection angles using derivatives of the wavefields.

15. The seismic data processing apparatus of claim 9, wherein the seismic data processing unit is further configured to interpolate the image angle gathers to generate another set of image angle gathers at positions different from bin centers of bins as defined by the equal area spherical binning technique.

16. The seismic data processing apparatus of claim 9, wherein the seismic data processing unit is further configured to use the image angle gathers to update a model used to compute the forward-propagated wavefield and the backward-propagated wavefield.

17. A computer readable recording medium storing executable codes, which, when executed on a computer make the computer perform a method for seismic exploration of an underground formation, the method comprising:
obtaining seismic data representing seismic excitations emitted from a source position and detected at a receiver position after traveling through the underground formation; and
processing the seismic data using a reverse time migration, RTM, method to generate image angle gathers, wherein with an equal area spherical binning technique is employed to define incident and azimuth angle bins at reflection points, and the image angle gathers are used generate the underground formation image enabling to determine the presence of hydrocarbons and/or other minerals.

18. The computer readable recording medium of claim 17, wherein the equal area spherical binning technique is determined by three numbers: two numbers characterize a base angular configuration, and a third number indicates a number of divisions on each side of a bin of the base angular configuration,
the method computer readable recording medium further comprising selecting a combination of the three numbers using a subset of the seismic data, the three numbers being varied within predetermined value ranges to identify the combination yielding a best achievable angular binning for a seismic data acquisition system used to acquire the seismic data.

19. The computer readable recording medium of claim 17, wherein the processing of the seismic data using RTM with the equal area spherical binning comprises:
initializing partial images corresponding to angular bins; and
for each collection of seismic traces in the seismic data from the same source position or the same receiver position:
computing a forward-propagated wavefield from the source position through the underground formation and a backward-propagated wavefield from the receiver position through the underground formation, applying an imaging condition in a given domain, using the forward-propagated wavefield and the backward-propagated wavefield for each point in the given domain computing incident and azimuth reflection angles between forward and backward wavefields, identifying one of the angular bins defined by the equal area spherical binning technique with a bin center closest to the incident and azimuth reflection angles; and adding a result of the imaging condition in the given domain point to one of the partial images corresponding to the one of the angular bins.

20. The computer readable recording medium of claim 17, wherein the method further comprises interpolating the image angle gathers to generate another set of image angle gathers at positions different from bin centers of bins as defined by the equal area spherical binning technique.

* * * * *